(12) United States Patent
Schober et al.

(10) Patent No.: US 8,526,000 B1
(45) Date of Patent: Sep. 3, 2013

(54) ATOMIC SENSOR PHYSICS PACKAGE WITH INTEGRATED TRANSMISSIVE AND REFLECTIVE PORTIONS ALONG LIGHT PATHS

(75) Inventors: Christina Marie Schober, St. Anthony, MN (US); James A. Vescera, Hopkins, MN (US); Jennifer S. Strabley, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/482,042

(22) Filed: May 29, 2012

(51) Int. Cl.
*G01N 21/59* (2006.01)
(52) U.S. Cl.
USPC ............................ 356/437; 356/432; 356/440
(58) Field of Classification Search
USPC ................. 356/432–444; 250/251, 573, 574, 250/575, 576; 372/20, 22
See application file for complete search history.

(56) References Cited

U.S. PATENT DOCUMENTS

| 4,817,112 | A | 3/1989 | Weber et al. |
| 6,406,578 | B1 | 6/2002 | Schober et al. |
| 6,570,459 | B1 | 5/2003 | Nathanson et al. |
| 6,654,392 | B1* | 11/2003 | Arbore et al. .................... 372/20 |
| 6,900,702 | B2 | 5/2005 | Youngner et al. |
| 7,612,885 | B2* | 11/2009 | Cole et al. ..................... 356/437 |
| 7,619,485 | B2 | 11/2009 | DeNatale et al. |
| 7,663,756 | B2* | 2/2010 | Cole .............................. 356/437 |
| 7,884,938 | B2* | 2/2011 | Cole .............................. 356/437 |
| 7,944,317 | B2 | 5/2011 | Strabley et al. |
| 7,965,147 | B2 | 6/2011 | Strabley et al. |
| 8,437,000 | B2* | 5/2013 | Cole et al. ..................... 356/437 |
| 2010/0111750 | A1 | 5/2010 | Touchberry et al. |
| 2011/0273713 | A1* | 11/2011 | Tuchman et al. ............. 356/437 |

OTHER PUBLICATIONS

Schober et al, "Systems and Methods for Gettering an Atomic Sensor", "U.S. Appl. No. 13/231,438, filed Sep. 13, 2011", pp. 1-17.
Schober et al, "Systems and Methods for External Frit Mounted Components", "U.S. Appl. No. 13/362,286, filed Jan. 31, 2012", , pp. 1-22.
Kitching, "Time for a Better Receiver: Chip-Scale Atomic Frequency References", "GPS World", Nov. 2007, pp. 1-6.
Knappe, "A microfabricated atomic clock", "Applied Physics Letters", Aug. 30, 2004, pp. 1460-1462, vol. 85, No. 9, Publisher: American Institute of Physics.

* cited by examiner

*Primary Examiner* — Sang Nguyen
(74) *Attorney, Agent, or Firm* — Fogg & Powers LLC

(57) ABSTRACT

In one embodiment, a block for a physics package of an atomic sensor is provided. The block comprises one or more sections of optically transparent material defining a vacuum sealed chamber, and including a plurality of transmissive and reflective surfaces to define a plurality of light paths intersecting the vacuum sealed chamber. The one or more sections of optically transparent material include a first monolithic section defining at least a portion of the vacuum sealed chamber. The first monolithic section includes a first portion disposed across a first light path of the plurality of light paths such that light in the first light path is incident on the first portion of the first monolithic section.

6 Claims, 4 Drawing Sheets

US 8,526,000 B1

ATOMIC SENSOR PHYSICS PACKAGE WITH INTEGRATED TRANSMISSIVE AND REFLECTIVE PORTIONS ALONG LIGHT PATHS

BACKGROUND

Efforts are being made to reduce the size and packaging of atomic sensors, including atomic clocks. One way to accomplish this is to reduce the size of the physics package for the atomic sensor. One example of a physics package is a glass block that is machined and sealed to maintain an ultra-high vacuum. The glass block includes a plurality of faces on its exterior and a plurality of angled borings that serve as light paths for the physics package. Mirrors and windows are fixedly attached over the exterior openings of the light path bores to seal the physics package. A cavity evacuation structure is attached to provide means for initial vacuum evacuation of the physics package. A sample container is attached to hold the atomic sample used as the frequency reference for the atomic sensor. Atomic sensors which operate by trapping and cooling atoms from a background vapor into a magneto optical trap (MOT) or optical molasses can be sensitive to the size of the optical beams. For example, the signal to noise ratio in such systems scales as the square of the beam size.

SUMMARY

In one embodiment, a block for a physics package of an atomic sensor is provided. The block comprises one or more sections of optically transparent material defining a vacuum sealed chamber, and including a plurality of transmissive and reflective surfaces to define a plurality of light paths intersecting the vacuum sealed chamber. The one or more sections of optically transparent material include a first monolithic section defining at least a portion of the vacuum sealed chamber. The first monolithic section includes a first portion disposed across a first light path of the plurality of light paths such that light in the first light path is incident on the first portion of the first monolithic section.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
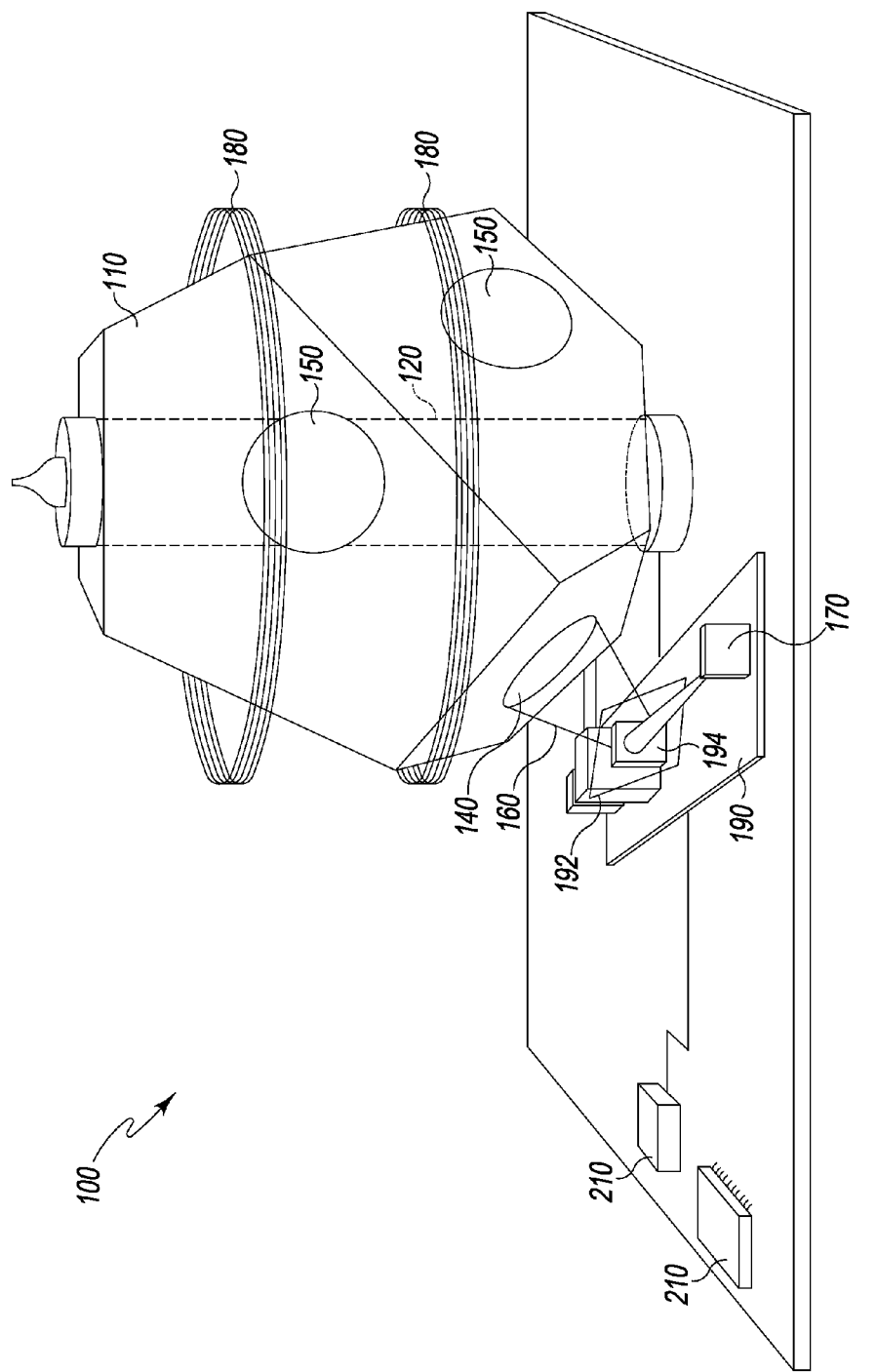
FIG. 1 is a perspective view of an example atomic sensor apparatus.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As the size of the glass block described above is further reduced, however, the glass can become too fragile resulting in breakage, fractures, and/or chips when machining the bores in the glass block. For sensors using laser cooled atoms from a vapor, this issue is compounded by the desire to make the bore sizes as large as possible to accommodate large optical beams. The subject matter described herein can address these issues by providing a glass block physics package having less bored volume than previous comparatively sized glass block physics packages. This helps improve the strength of the glass block while allowing for large optical beams, enabling the glass block to be further reduced in size while achieving a desired signal-to-noise ratio of the atomic sensor.

Figure 2:
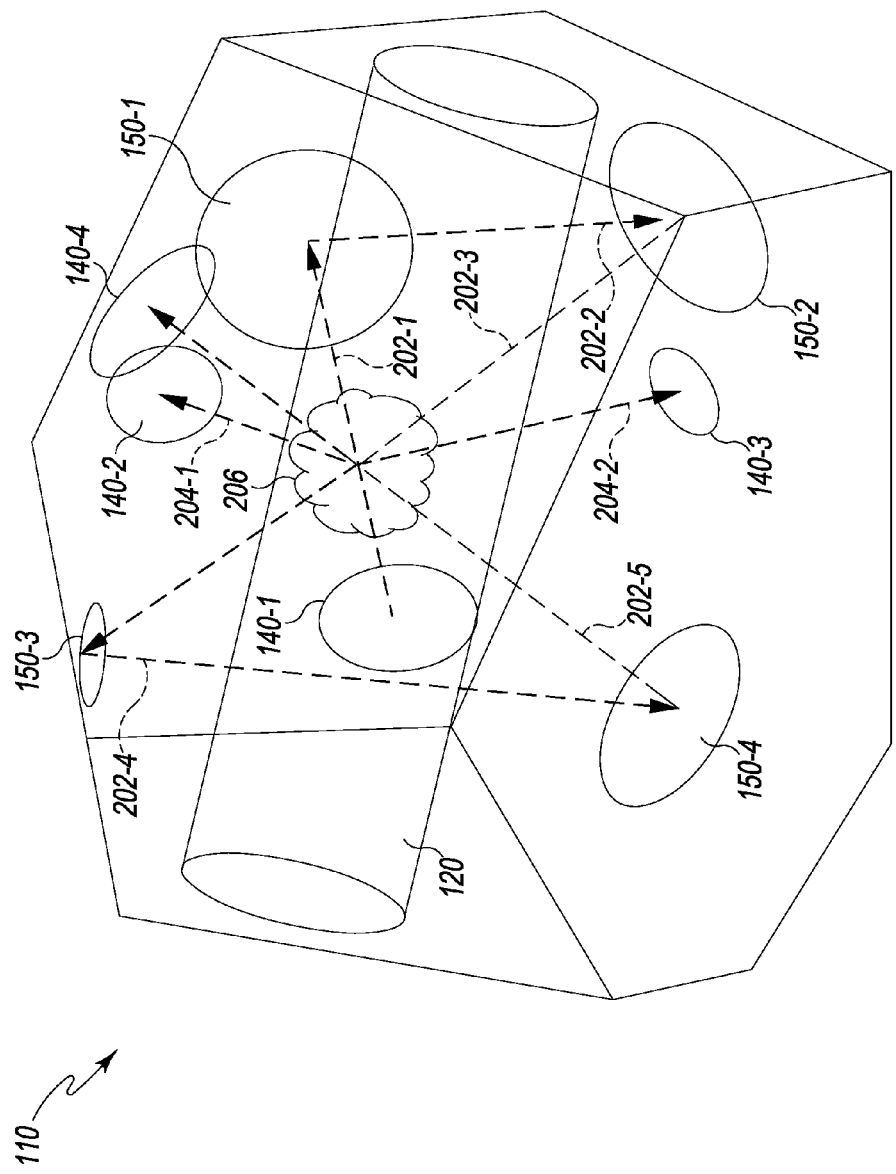
FIG. 2 is a see-through view of the physics package for the atomic sensor apparatus shown in FIG. 1.

FIG. 1 is a perspective view of an example atomic sensor apparatus 100. The sensor apparatus 100 includes an atomic sensor, such as an accelerometer or atomic clock, including a physics package 110. The physics package 110 defines a vacuum sealed chamber 120 that holds alkali metal source for atoms such as rubidium (e.g., Rb-87) or cesium in a passive vacuum with or without gettering agents. The vacuum sealed chamber 120 can be any shape as desired such as cylindrical as shown in FIGS. 1 and 2 or other shapes such as shapes that utilize more of the interior volume of the physic package 110. Depending on the design of the sensor 100, a plurality of light paths can be provided that intersect within the vacuum sealed chamber 120. The physics package 110 includes one or more transmissive portions 140 to allow light beams to enter and exit the vacuum sealed chamber 120 and one or more reflective surfaces 150 (e.g., mirrors) to steer the light beams along the desired light paths. One or more beams of light 160 from one or more laser light sources 170 enters the physic package 110 through a corresponding transmissive portion 140 and is directed through the physics package 110 along at least some of the light paths by the reflective surfaces 150. More detail regarding the physics package 110 is shown in FIG. 2.

The atomic sensor 100 can also include a micro-optical bench 190 that includes the laser light source(s) 170, such as a semiconductor laser such as a vertical cavity surface emitting laser (VCSEL), a distributed feedback laser or an edge emitting laser. The micro-optical bench 190 can also include a micro-fabricated vapor cell 192 containing an alkali metal such as rubidium (e.g., Rb-87) or cesium to provide absolute frequency stabilization of the laser 170 to an appropriate atomic transition, and a beam splitter 194 for distributing the beam of light 160 to the vapor cell 192 and the physics package 110. The atomic sensor 100 also includes a plurality of magnetic field coils 180 (two are shown in the example of FIG. 1), such as Helmholtz and anti-Helmholtz coils, for generating magnetic fields used for operation of the atomic sensor 100. The atomic sensor 100 also includes control electronics 210. The vapor cell 192 containing an alkali metal is used to frequency stabilize the beam of light 160 from the single laser light source 170 to a predetermined atomic transition of the alkali metal.

Embodiments of the atomic sensor 100 can also include a local oscillator, an antenna, and a photo-detector. In embodiments where the atomic sensor 100 is a microwave atomic clock, a microwave crystal oscillator can be used to generate a microwave signal at the clock atomic transition of the alkali metal. The antenna or similar structure (e.g., a waveguide) is used to deliver the microwave signal from the local oscillator to perform spectroscopy on the alkali metal atoms of the physics package 110. Photo-detectors are used for detecting the fluorescence of the alkali metal atom after the spectroscopy. This spectroscopy signal can be used to provide long term frequency stability to the microwave crystal oscillator.

FIG. 2 is a see-through view of the physics package 110. The physics package 110 can be composed of one or more monolithic sections of an optically transparent material. Suitable materials for a monolithic section of optically transparent material include, for example, glass, such as glass-ceramic (e.g., MACOR®) or an optical glass (e.g., BK-7 or Zerodur®), or other transparent material such as sapphire. In general, a monolithic section of optically transparent material should have the following properties, be vacuum tight, non-permeable to hydrogen or helium, non-reactive with the material to be introduced into the vacuum sealed chamber 120, and be low loss at the wavelength of interest. Other properties include low permeability to inert gases (such as Argon), compatibility with frit bonding, and being suitable for baking at temperatures around or over 200 degrees Celsius. In examples where multiple monolithic sections of optically transparent material are used, each section can be of the same or different composition than other sections.

As mentioned above, the physics package 110 defines a vacuum sealed chamber 120 and a plurality of light paths intersect the vacuum sealed chamber 120. For example, a single monolithic section of optically transparent material can define the vacuum sealed chamber 120 and one or more of the light paths. In an example, all the light paths and the vacuum sealed chamber 120 can be defined by the single monolithic block of optically transparent material. In another example, multiple monolithic sections of optically transparent material can be fritted together to form the vacuum sealed chamber 120 and the light paths. In any case, the one or more monolithic sections of optically transparent material define the vacuum sealed chamber 120 and the plurality of light paths.

The plurality of light paths include optical lightwave paths 202 and measurement light paths 204. The optical lightwave paths 202 are defined by the plurality of transmissive surfaces 140 and the reflective surfaces 150 of the physics package 110. That is, the path of the light used for the optical portion of the magneto-optical-trap is controlled by the transmissive surface 140 and the reflective surface 150 of the physics package 110. As used herein, a light path comprises a generally straight path traversed by a beam of light. For example, a first light path 202-1 is a path traversed by the optical trap beam of light 160 through a first transmissive portion 140-1, through a portion of the physics package 110, and to a first reflective surface 150-1.

The arrangement of the transmissive surface 140 and the reflective surfaces 150 directs the beam of light 160 from the laser light source(s) 170 through the physics package 110 to create optical beams that cross at 90 degree angles relative to one another in the vacuum sealed chamber 120. For example, the beam of light 160 propagating along the first light path 202-1 can enter the physics package 110 by transmitting through the transmissive portion 140-1 of a monolithic section of optically transparent material making up the physics package 110. After transmitting through the transmissive portion 140-1, the beam of light 160 can propagate through the vacuum sealed chamber 120 and to the first reflective surface 150-1. Upon reaching the first reflective surface 150-1, the beam of light 160 is reflected to the second light path 202-2. In this manner the transmissive portion(s) 140 and reflective surface(s) 150 can define the light paths of the physics package 110.

The light paths 202, 204 can transmit through the optically transparent material of the physics package 110 as well as through free space (e.g., within the vacuum sealed chamber 120). For example, the first light path 202-1, as mentioned above, can transmit through the first transmissive portion 140-1 of the physic package 110 to the vacuum sealed chamber 120. Similarly, the fluorescence light from the atoms 206 can propagate along the first measurement light path 204-1 and transmit through the second transmissive portion 140-2 to an external detector. Fluorescence light on the second measurement light path 204-2 can also transmit through the third transmissive portion 140-3. In order to allow light to propagate therethrough, the transmissive portion(s) 140 can comprise optically transparent glass. In some examples, the physics package 110 can be constructed with many or very large transmissive portions such that the measurement light path(s) 204 can be selected after construction of the physics package 110. Selecting the measurement light paths 204 after construction can result a better signal to noise ratio due to selection of measurement light paths based on operation of the atomic sensor after construction.

In order to provide structural integrity to the physics package 110, one or more of the transmissive portions 140 can be an integrated part of a monolithic section of optically transparent material forming the physics package 110. For example, the first transmissive portion 140-1 can be a portion of a monolithic section of optically transparent material that also defines at least a portion of the vacuum sealed chamber 120. That is, this example monolithic section of optically transparent material can include an optically transparent portion disposed across the first light path 202-1 that functions as a transmissive portion 140 transmitting light into and out of the vacuum sealed chamber 120. Light on the first light path 202-1 can be incident on the optically transparent portion of this example monolithic section of optically transparent material and can transmit therethrough into and out of the physics package 110. The transmissive portion 140 can include the volume of optically transparent material from the exterior of the physics package 110 to the vacuum sealed chamber 120 along the first light path 202-1. Thus, in this example, the first transmissive portion 140-1 makes up the thickness of the physics package 110 from the exterior to the vacuum sealed chamber 120 along the first light path 202-1. In another example, the first transmissive portion 140-1 can be thinner and a bore or similar cavity along the first light path 202-1 can connect the light path from first transmissive portion 140-1 to the vacuum sealed chamber 120. This monolithic section of optically transparent material also defines at least a portion of the vacuum sealed chamber 120. In an example, this monolithic section of optically transparent material can define the entire vacuum sealed chamber 120 and can make up most or all of the physics package 110.

To provide for a transmissive portion 140 in a monolithic section of optically transparent material that also defines at least a portion of the vacuum sealed chamber 120, the surfaces of the optically transparent material at the location of the transmissive portion 140 along the light path 202 are made optically transparent such that light can easily transmit from one side through the transmissive portion 140 and out the other side. In an example, an anti-reflective coating can be placed over the exterior and/or interior surfaces of the transmissive portion 140.

Similar to the transmissive portion(s) 140, one or more of the reflective surfaces 150 can be an integral part of a monolithic section of optically transparent material that also defines at least a portion of the vacuum sealed chamber 120. For example, a monolithic section of optically transparent material can include a surface that is disposed across the second light path 202-2. Light in the second light path 202-2 is incident on this surface (e.g., an interior surface of the physics package 110). This surface can be coated with a reflective coating such that the surface acts as the first reflective surface 150-1. As the first reflective surface 150-1, defines the intersection between the first light path 202-1 and the second light path 202-2. In an example, the first reflective surface 150-1 is disposed at or near a main portion of the vacuum sealed chamber 120 defined in the physics package 110. In another example, a first and second bores or similar cavities are present along the first and second light paths 202-1, 202-2 that extend from the vacuum sealed chamber 120 into the physics package 110 and end at the first reflective surface 150-1. Here the first reflective surface 150-1 is set back from the main portion of the vacuum sealed chamber 120. One of, or both the first and second bores can be present in the monolithic section of optically transparent material that has the first reflective surface 150-1. This monolithic section of optically transparent material having the first reflective surface 150-1 can also define at least a portion of the vacuum sealed chamber 120. In an example, this monolithic section of optically transparent material can define the entire vacuum sealed chamber 120 and can make up most or all of the physics package 110. In an example, one or more of the reflective surfaces 150 can be disposed on an exterior of the physics package 110 such that the light in a light path transmits through a transmissive portion 140 of a section of optically transparent material, is incident on the reflective surface 150 and reflects back through the transmissive portion 140 of the optically transparent material.

To provide for a first reflective surface 150-1 in a monolithic section of optically transparent material that also defines at least a portion of the vacuum sealed chamber 120, the surface at the intersection of the first and second light paths 202-1, 202-2 is made smooth and is coated with a reflective coating. In an example, the reflective coating can include a single or multilayer metal or dielectric stack coating. The reflective surfaces 150 can be planar or curved to slightly focus a beam of light as necessary. The other reflective surfaces 150 can be integral to a monolithic section of optically transparent material in a similar manner.

In an example, the physics package 110 can be composed entirely of a single monolithic block of optically transparent material. In this example, all the transmissive portions 140 and the reflective surfaces 150 are defined in the single monolithic block of optically transparent material as well as the vacuum sealed chamber 120 and any bores along the light paths. The vacuum sealed chamber 120 can be a central bore through the single monolithic block of optically transparent material.

In another example, the physics package 110 is primarily composed of a monolithic block of optically transparent material, such that the vacuum sealed chamber 120 is entirely defined by a monolithic block of optically transparent material. Here again, the vacuum sealed chamber 120 can be a central bore through the monolithic block of optically transparent material, and this monolithic block of optically transparent material can also define one or more of the transmissive portions 140 and/or one or more of the reflective surfaces 150 along one or more light paths 202. In some examples, the monolithic block of optically transparent material can also define a bore that extends along one or more of the light paths 202 and defines an exterior opening over which a separate piece such as a window or mirror can be fixedly attached. The window or mirror can be fitted to the single monolithic block of optically transparent material to form an air tight seal. In an example, a bore for an optical lightwave path 202 can extend from an exterior opening on one side of the single monolithic block of optically transparent material to the vacuum sealed chamber 120 and partially into the other side of the single monolithic block of optically transparent material. At the end of the bore in the other side of the single monolithic block of optically transparent material, a transmissive portion 140 or a reflective surface 150 can be formed. Opposite this surface is the exterior opening of the bore. Extending the bore from one side through the single monolithic block of optically transparent material in this manner can enable easier machining of the internal surfaces at the end of the bores for formation of the transmissive portion 140 or reflective surface 150. In this manner, the single monolithic block of optically transparent material can define one or more integral transmissive portions 140 and/or reflective surfaces 150 and can also have one or more windows and/or reflective surfaces attached over exterior openings therein.

In another example, the vacuum sealed chamber 120 can be formed by fixedly attaching together (e.g., fritting) multiple monolithic sections of optically transparent material. For example, the vacuum sealed chamber 120 can be formed by fitting together two, three, four or more monolithic sections of optically transparent material. Each of these multiple monolithic sections of optically transparent material can define a portion of the vacuum sealed chamber 120 such that when fritted together the entire vacuum sealed chamber 120 is formed having an exterior opening on each end of the physics package 110. Along with defining a portion of the vacuum sealed chamber 120, one or more of these monolithic sections of optically transparent material can also define an integral transmissive portion 140 and/or reflective surface 150. A portion of the respective monolithic section of optically transparent material can include the transmissive portion 140 and/or reflective surface 150 as described above with respect to FIG. 2. One or more of these monolithic sections of optically transparent material can also define a bore along a light path having an exterior opening and a window or mirror can be fixedly attached over the exterior opening using, for example, frit. In this manner, the physics package 110 can be formed of multiple monolithic sections of optically transparent material.

As mentioned above, the plurality of optical lightwave paths 202 can be formed in the physics package 110 in a geometric arrangement such that three or fewer light source(s) can be used for the optical trap of the atomic sensor 100. In an example, the exterior of the physics package 110 is shaped to accommodate this geometric arrangement for the optical lightwave paths 202. In this example, the physics package 110 can include a plurality of faces on the exterior thereof positioned at angles to one another. The angles can be set to the angle of a surface of a transmissive portion 140 or reflective surface 150 corresponding to the surface such that the transmissive portion 140 or reflective surface 150 properly transmits or directs light along the appropriate light path.

In an example, a chamber evacuation structure (e.g., a tube) can be fixedly attached over a first exterior opening of the vacuum sealed chamber 120 and a sample container can be fixedly attached over a second exterior opening respectively. An alternative embodiment uses a cavity evacuation structure, but not a sample container. The chamber evacuation structure can be used to perform the initial evacuation of the vacuum sealed chamber 120 to ultra-high vacuum conditions. In an example, a vacuum pressure on the order of approximately 10 to the −7 to 10 to the −8 torr is acceptable. The sample container can hold an alkali metal source which can be released from the sample contained into the vacuum sealed chamber 120 after the vacuum sealed chamber 120 is sealed. The chamber evacuation structure and sample container can be fixedly attached using any of various techniques to create a vacuum tight seal, such as frit sealing, using a swage-lock, or an O-ring. Suitable materials for the chamber evacuation structure and the sample container include, for example, nickel, iron, aluminum, and nickel-iron alloys such as invar. The chamber evacuation structure and sample container can also serve as electrodes for forming a plasma for discharge cleaning of the physics package 110 and to enhance pump down and bake out. Some examples of the physics package 110 can include a gettering material within the vacuum sealed chamber 120 to limit the partial pressures of some gasses (e.g., hydrogen).

In operation of an example using a single beam of light, the beam of light from a light source is directed into the physics package 110 transmitting through the first transmissive portion 140-1 into the first light path 202-1. The light beam travels down the first light path 202-1 through the vacuum sealed chamber 120 to the first reflective surface 150-1. The first reflective surface 202-1 reflects the light beam down the second light path 202-2 to the second reflective surface 150-2. The second reflective surface 150-2 next reflects the light beam down the third light path 202-3 through the vacuum sealed chamber 120 to the third reflective surface 150-3. The third reflective surface 150-3 next reflects the light beam down the fourth light path 202-4 to the fourth reflective surface 150-4. The fourth reflective surface next reflects the light beam down the fifth light path 202-5 through the vacuum sealed chamber 120. The light beam then transmits through the fourth transmissive portion 140-4. A quarter wave plate is inserted over the fourth transmissive surface 140-4 in the fifth light path 202-5, followed by a polarization optic and then by a mirror which are also both inserted in the fifth light path 202-5. These can be glued or otherwise attached to the outside of the physics package 110 to retro-reflect the beam on the fifth light path 202-5. This mirror and other components reflect the beam of light backwards on the fifth light path 202-5 to the fourth reflective surface 150-4. The beam of light then retraces its path to exit the physics package 110 by transmitting through the first transmissive portion 140-1. The effect of this is that the plurality of reflective surfaces 150 direct the beam of light from the light source(s) 170 down the optical lightwave paths 202 so as to create three retro-reflected beams that cross at 90 degree angles to one another. It should be understood that although the above description is with respect to an atomic sensor 100 using a single light beam, more than one light beam can be used with appropriate changes to the transmissive portions 140 and reflective surfaces 150. For example, external beam splitters can be used to separate the individual x, y, and z oriented beams prior to entering the physics package 110. The optical beams and a magnetic field produced by the magnetic field coils 180 are used in combination to slow and cool the atoms 206 from the background alkali vapor and to trap the atoms 206 (about 10 million atoms at a temperature as low as 10 micro-Kelvins at the center of the intersection of the optical beams) in a magneto-optical-trap. In examples using the folded retro-reflected beam path, efficient use of the light source(s) 170 can be achieved. The reflective surfaces 150 and, in some examples, diffractive optics are used to steer the optical beams and control the polarization of the optical beams, respectively, while minimizing scattered light and size. A sensor signal is read through the second transmissive portion 140-2 along the first measurement light path 204-1 and through the third transmissive portion 140-3 along the second measurement light path 204-2. In alternative embodiments of the physics package 110, more or fewer measurement light paths 204 can be used.

Figure 3A:
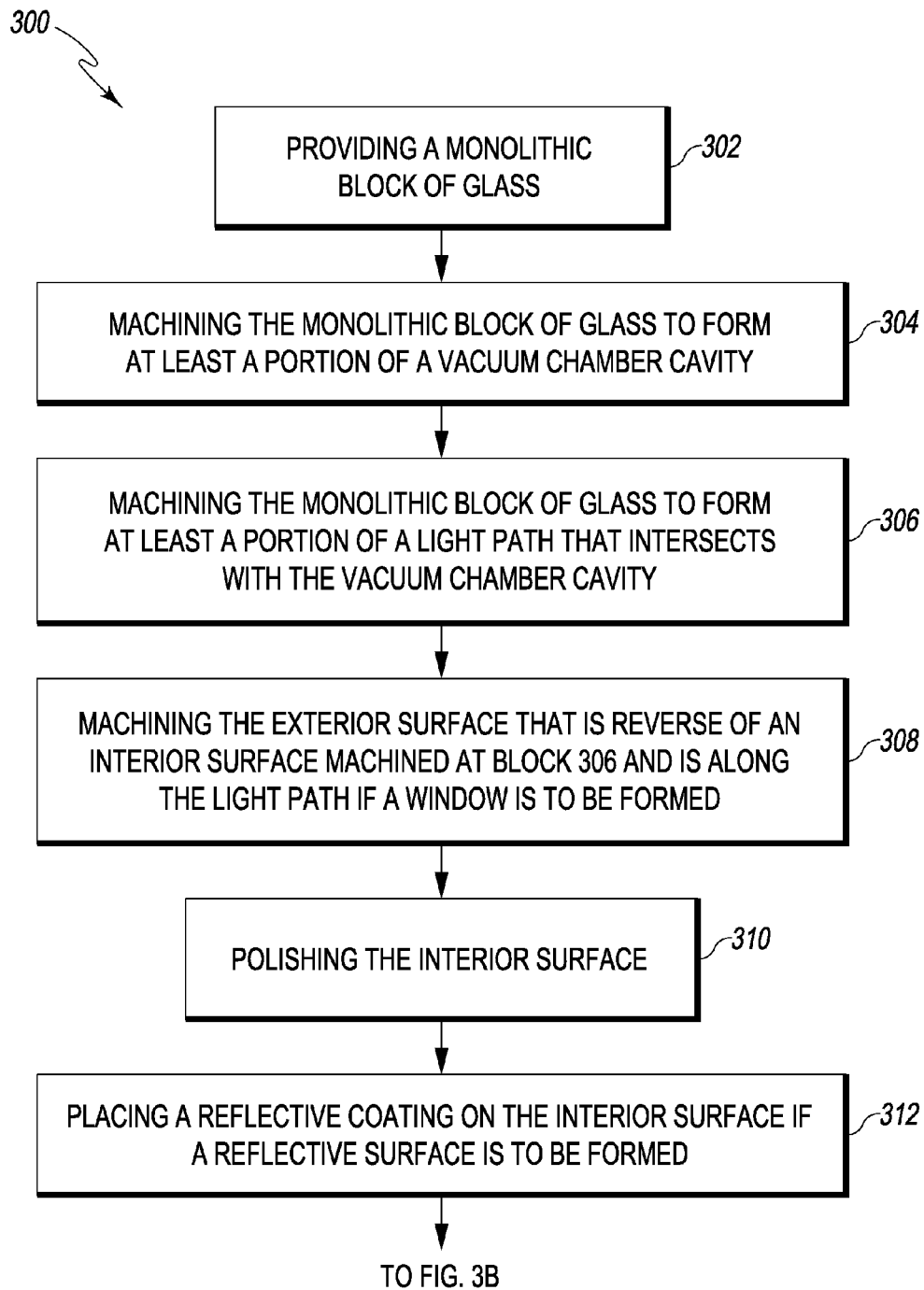
FIGS. 3A and 3B are a flow chart of an example method of forming a monolithic block of glass into the physics package or a section of the physics package shown in FIG. 2.
Figure 3B:
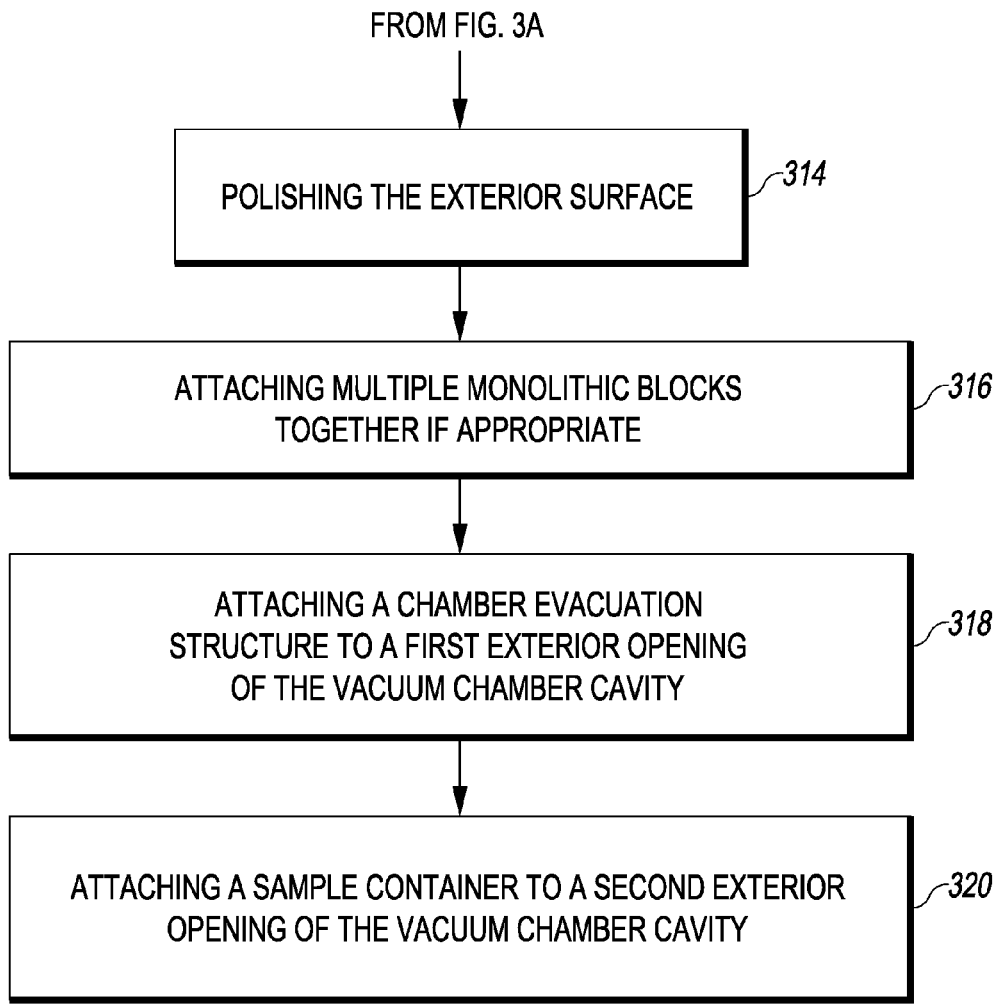

FIGS. 3A and 3B are a flow chart of an example method 300 of forming a monolithic block of optically transparent material into a physics package 110 or a section of a physics package 110. At block 302, a monolithic block of optically transparent material is provided.

At block 304, the monolithic block of optically transparent material is machined to form at least a portion of the vacuum sealed chamber 120. In examples, where a single monolithic block of optically transparent material defines the entire vacuum sealed chamber 120, the vacuum sealed chamber 120 can be formed by boring a central bore through the monolithic block of optically transparent material. In examples where the vacuum sealed chamber 120 is formed by fixedly attaching together multiple monolithic sections of optically transparent material, the monolithic block of optically transparent material can be machined to form its portion of the surface defining the vacuum sealed chamber 120. The other sections of optically transparent material can also be machined to form their portions of the surface defining the vacuum sealed chamber 120.

At block 306, the monolithic block of optically transparent material is machined to form at least a portion of a light path that intersects with the vacuum sealed chamber 120. In examples where a transmissive portion 140 comprising most or all of the thickness of the physics package 110 from the exterior to the vacuum sealed chamber 120 is to be formed in the monolithic block of optically transparent material, the interior surface of the monolithic block of optically transparent material at the location of the transmissive portion 140 can be machined to smooth, flatten, polish, grind and/or otherwise prepare the surface. In other examples, machining can include boring the monolithic block of optically transparent material along a portion of one or more light paths and smooth, flatten, polish, grind and/or otherwise preparing (e.g., forming a desired curvature for focusing of light) an end interior surface of the bore for a transmissive portion 140 or a reflective surface 150. In examples where a reflective surface 150 is to be formed without boring, the interior surface of the monolithic block of optically transparent material can be smooth, flatten, polish, grind and/or otherwise prepared (e.g., forming a desired curvature for focusing of light) without prior boring. In some examples one or more of the bores can extend to the exterior of the physics package 110. The machining can leave the monolithic block of optically transparent material slightly oversized such that with polishing of material (blocks 310 and 314); the resulting monolithic block of optically transparent material is the desired size.

At block 308, if a transmissive portion 140 is to be formed, the exterior surface that is reverse of the interior surface on the monolithic block of optically transparent material and is along (e.g., aligned with) the light path can also be machined to smooth, flatten, polish, grind and/or otherwise prepare the surface.

At block 310, the interior surface that was machined at block 306 can be polished (e.g., etched) to further smooth the surface and/or make the surface optically transparent.

At block 312, if the interior surface is to be a reflective surface 150, a reflective coating can be put onto the interior surface.

At block 314, if an exterior surface was prepared at block 308, the exterior surface can be polished to further smooth the surface and/or make the surface optically transparent.

In an example of either block 310 or 314, a portion of the surface larger than either the surfaces necessary for the transmissive portion 140 or reflective surface 150 can be polished. In an example, the entire surface of the monolithic block of optically transparent material can be polished such that blocks 310 and 314 are polished at the same time.

At block 316, multiple monolithic blocks of optically transparent material can be fixedly attached together to form a physics package 110 if more than a single monolithic block of optically transparent material is used. The multiple monolithic blocks of optically transparent material can be fixedly attached together by fritting. The multiple monolithic blocks of optically transparent material can be attached together to form the vacuum sealed chamber 120 and/or the light paths of the physics package 110.

At block 318, a chamber evacuation structure can be attached to a first exterior opening of the vacuum sealed chamber 120.

At block 320, a sample container can be attached to a second exterior opening of the vacuum sealed chamber 120. In an example, the chamber evacuation structure and the sample container can be attached at the same time multiple monolithic bocks of optically transparent material are fixedly attached together.

EXAMPLE EMBODIMENTS

Example 1 includes a block for a physics package of an atomic sensor comprising: one or more sections of optically transparent material defining a vacuum sealed chamber, and including a plurality of transmissive and reflective surfaces to define a plurality of light paths intersecting the vacuum sealed chamber; the one or more sections of optically transparent material including a first monolithic section defining at least a portion of the vacuum sealed chamber, the first monolithic section including a first portion disposed across a first light path of the plurality of light paths such that light in the first light path is incident on the first portion of the first monolithic section.

Example 2 includes the block of Example 1, wherein the plurality of light paths include a plurality of optical lightwave paths and at least one measurement light path.

Example 3 includes the block of any of Examples 1 or 2, wherein an inner and outer surface of the first portion of the first section are optically transparent to transmit light in and out of the first light path.

Example 4 includes the block of any of Examples 1-3, wherein the first portion of the first section includes a reflective coating on a surface thereof to reflect light in the first light path.

Example 5 includes the block of any of Examples 1-4, wherein the first monolithic section defines a bore along the first light path, the bore ending at the first portion of the first monolithic section.

Example 6 includes the block of any of Examples 1-5, wherein the one or more sections of optically transparent material include a second monolithic section defining at least a portion of the vacuum sealed chamber, the second monolithic section of optically transparent material including a second portion disposed across the first light path such that light in the first light path is incident on the second portion of the second monolithic section, wherein the section monolithic section is fixedly attached to the first monolithic section.

Example 7 includes the block of Example 6, wherein the first monolithic section and the second monolithic section define the entire vacuum sealed chamber.

Example 8 includes the block of any of Examples 6 or 7, wherein the first monolithic section and the second monolithic section are fixedly attached with a frit seal.

Example 9 includes the block of any of Examples 1-8, wherein the first monolithic section defines the entire vacuum sealed chamber; and wherein the first monolithic section defines a plurality of bores each bore along a light path of the plurality of light path, each bore extending from an exterior opening in the first monolithic section and ending at one of an optically transparent portion or a reflective surface of the first monolithic section; the one or more sections of optically transparent material including one or more mirrors or windows that are fixedly attached over the exterior openings in the first monolithic section.

Example 10 includes the block of any of Examples 1-9, comprising: a chamber evacuation structure fixedly attached over a first exterior opening of the vacuum sealed chamber; and a sample container fixedly attached over a second exterior opening of the vacuum sealed chamber.

Example 11 includes the block of any of Examples 1-10, wherein the one or more sections of optically transparent material include a plurality of faces on an exterior thereof, the plurality of faces disposed at predetermined angles to one another.

Example 12 includes the block of any of Examples 1-11, wherein the first monolithic section is composed of one of a glass, glass-ceramic, an optical glass, or sapphire.

Example 13 includes a method of forming a block for a physics package, the method comprising: machining a monolithic mass of optically transparent material to form at least a portion of a vacuum sealed chamber; machining the monolithic mass of optically transparent material to form at least a portion of a light path intersecting with the vacuum sealed chamber; polish the monolithic mass of optically transparent material, wherein polishing includes etching a first surface at an end of the at least a portion of the light path such that the first surface is optically transparent; machining the monolithic mass of optically transparent material to form a second surface reverse of the first surface and aligned with the portion of the light path; polishing the second surface such that the second surface is optically transparent; and attaching a chamber evacuation structure to a first exterior opening of the vacuum sealed chamber.

Example 14 includes the method of Example 13, comprising: machining a second monolithic mass of optically transparent material to form at least a portion of the vacuum sealed chamber; machining the second monolithic mass of optically transparent material to form a portion of another light path extending from the vacuum sealed chamber into the second monolithic mass of optically transparent material; polishing the second monolithic mass of optically transparent material, wherein polishing includes etching a third surface at an end of the portion of the other light path such that the third surface is optically transparent; machining the second monolithic mass of optically transparent material to form a fourth surface reverse of the third surface and aligned with the portion of the other light path; polishing the fourth surface such that the fourth surface is optically transparent; and fixedly attaching the second monolithic mass of optically transparent material to the monolithic mass of optically transparent material using a vacuum tight seal to form the block and the vacuum sealed chamber therethough.

Example 15 includes the method of Example 14, wherein fixedly attaching includes fritting the second monolith mass of optically transparent material and the monolithic mass of optically transparent material together.

Example 16 includes the method of any of Examples 13-15, wherein machining the monolithic mass of optically transparent material to form a portion of a light path includes one or more of drilling a bore, polishing, and grinding.

Example 17 includes the method of any of Examples 13-16, comprising: machining the monolithic mass of optically transparent material or another monolithic mass of optically transparent material to form a surface aligned with the portion of the light path; and coating the surface with a reflective coating such that light in the light path is reflected off of the surface.

Example 18 includes the method of any of Examples 13-17, wherein machining the monolithic mass of optically transparent material to form a portion of a light path includes forming an exterior opening opposite the first surface for the light path, the method comprising: fixedly attaching one of a window or a mirror using a vacuum tight seal over the exterior opening.

Example 19 includes a block for a physics package of an atomic sensor comprising: a monolithic optically transparent material structure defining: a vacuum sealed chamber having a first exterior opening and a second exterior opening; a plurality of light path bores, each of the plurality of light path bores having an exterior opening and at least one of the plurality of light path bores ends at an internal surface of the monolithic optically transparent material structure; wherein the internal surface is optically transparent such that light in the respective light path bore can transmit through the monolithic optically transparent material structure to or from an exterior portion of the monolithic optically transparent material structure; a plurality of mirrors or windows fixedly attached over the exterior openings of the light path bores; a chamber evacuation structure fixedly attached using a vacuum tight seal over the first exterior opening of the vacuum sealed chamber; and a sample container fixedly attached using a vacuum tight seal over a second exterior opening of the vacuum sealed chamber.

Example 20 includes the block of Example 19, wherein at least one of the plurality of light path bores ends at an internal surface having a reflective coating thereon.

Example 21 includes the block of any of Examples 19 or 20, comprising at least one measurement light path configured to transmit through a transmissive portion of the monolithic optically transparent material structure.

Example 22 includes the block of any of Examples 19-21, wherein an external surface opposite the internal surface is optically transparent to transmit light in and out of the respective light path bore.

Example 23 includes the block of any of Examples 19-22, wherein the monolithic optically transparent material structure includes a plurality of faces on an exterior thereof, the plurality of faces disposed at predetermined angles to one another.

Example 24 includes the block of any of Examples 19-23, wherein the monolithic optically transparent material structure is composed of one of a glass, glass-ceramic, an optical glass, or sapphire.

What is claimed is:

1. A method of forming a block for a physics package, the method comprising:
   machining a monolithic mass of optically transparent material to form at least a portion of a vacuum sealed chamber;
   machining the monolithic mass of optically transparent material to form at least a portion of a light path intersecting with the vacuum sealed chamber;
   polish the monolithic mass of optically transparent material, wherein polishing includes etching a first surface at an end of the at least a portion of the light path such that the first surface is optically transparent;
   machining the monolithic mass of optically transparent material to form a second surface reverse of the first surface and aligned with the portion of the light path;
   polishing the second surface such that the second surface is optically transparent; and
   attaching a chamber evacuation structure to a first exterior opening of the vacuum sealed chamber.

2. The method of claim 1, comprising:
   machining a second monolithic mass of optically transparent material to form at least a portion of the vacuum sealed chamber;
   machining the second monolithic mass of optically transparent material to form a portion of another light path extending from the vacuum sealed chamber into the second monolithic mass of optically transparent material;
   polishing the second monolithic mass of optically transparent material, wherein polishing includes etching a third surface at an end of the portion of the other light path such that the third surface is optically transparent;
   machining the second monolithic mass of optically transparent material to form a fourth surface reverse of the third surface and aligned with the portion of the other light path;
   polishing the fourth surface such that the fourth surface is optically transparent; and
   fixedly attaching the second monolithic mass of optically transparent material to the monolithic mass of optically transparent material using a vacuum tight seal to form the block and the vacuum sealed chamber therethough.

3. The method of claim 2, wherein fixedly attaching includes fritting the second monolith mass of optically transparent material and the monolithic mass of optically transparent material together.

4. The method of claim 1, wherein machining the monolithic mass of optically transparent material to form a portion of a light path includes one or more of drilling a bore, polishing, and grinding.

5. The method of claim 1, comprising:
   machining the monolithic mass of optically transparent material or another monolithic mass of optically transparent material to form a surface aligned with the portion of the light path; and
   coating the surface with a reflective coating such that light in the light path is reflected off of the surface.

6. The method of claim 1, wherein machining the monolithic mass of optically transparent material to form a portion of a light path includes forming an exterior opening opposite the first surface for the light path, the method comprising:
   fixedly attaching one of a window or a mirror using a vacuum tight seal over the exterior opening.

* * * * *